Oct. 27, 1953 — P. ASCHWANDEN — 2,656,612
GAUGE FOR ADJUSTING BLANKS IN GEAR CUTTING MACHINES
Filed Feb. 26, 1948 — 3 Sheets-Sheet 1
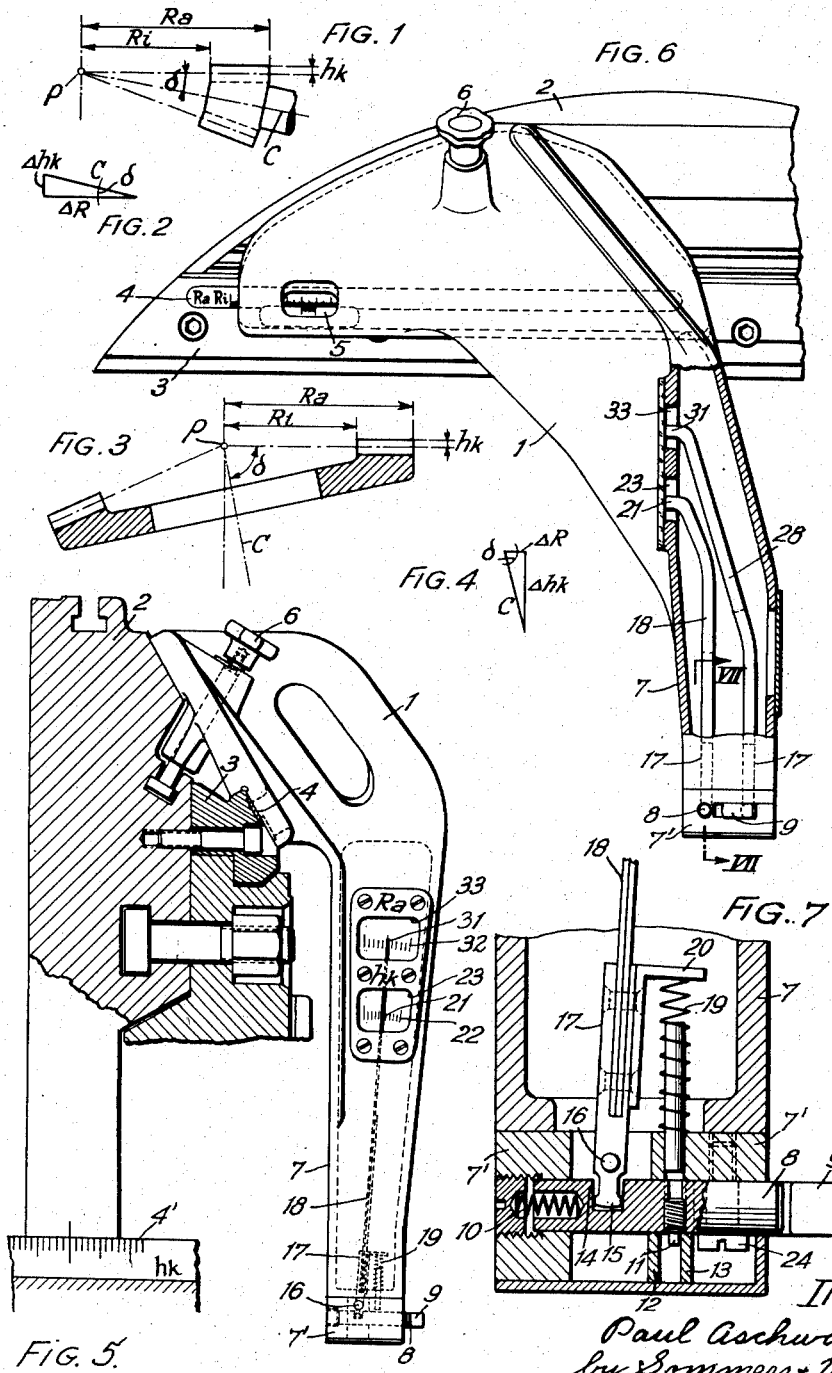
Inventor:
Paul Aschwanden
by Sommers & Young
Attorneys Oct. 27, 1953  P. ASCHWANDEN  2,656,612
GAUGE FOR ADJUSTING BLANKS IN GEAR CUTTING MACHINES
Filed Feb. 26, 1948
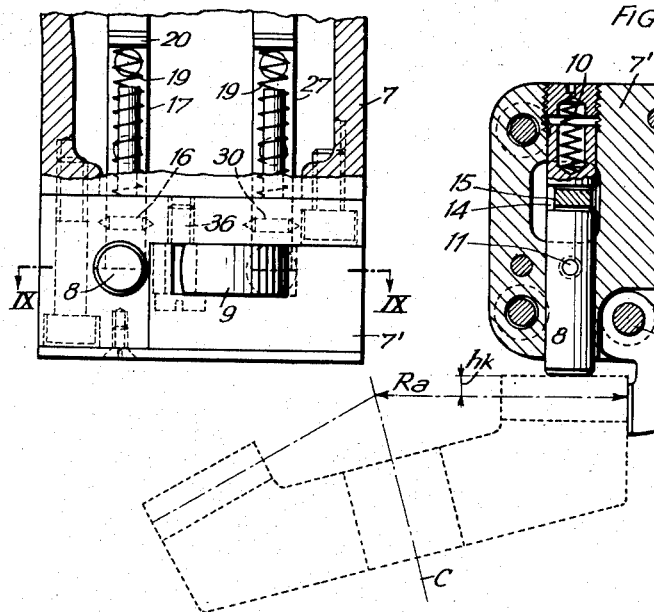
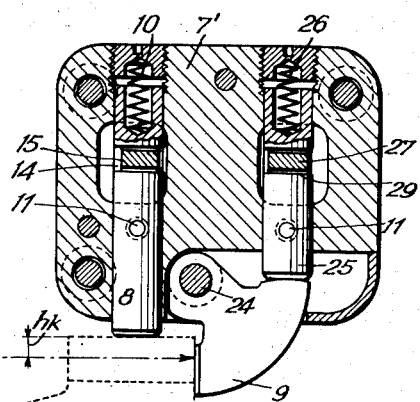
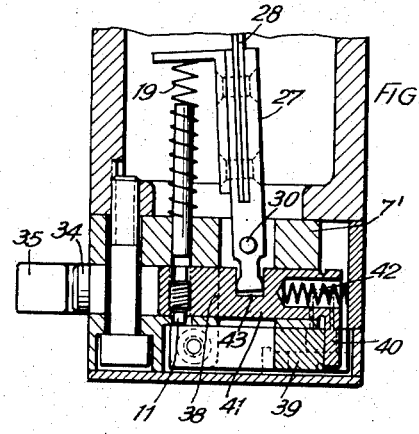
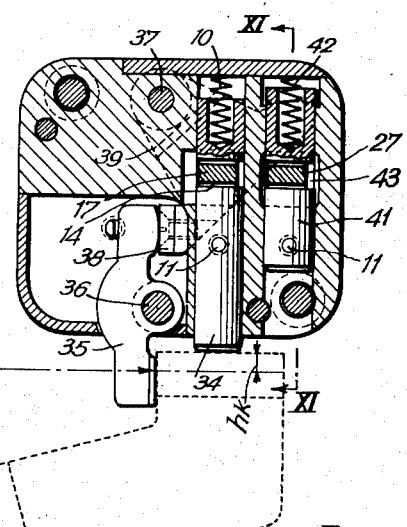
Inventor:
Paul Aschwanden
by Sommers - Young
Attorneys Oct. 27, 1953  P. ASCHWANDEN  2,656,612
GAUGE FOR ADJUSTING BLANKS IN GEAR CUTTING MACHINES
Filed Feb. 26, 1948  3 Sheets-Sheet 3

Inventor:
Paul Aschwanden
by Sommers-Young
Attorneys

Patented Oct. 27, 1953

2,656,612

UNITED STATES PATENT OFFICE 2,656,612

GAUGE FOR ADJUSTING BLANKS IN GEAR CUTTING MACHINES

Paul Aschwanden, Zurich, Switzerland, assignor to Verwaltungsgesellschaft der Werkzeugmaschinenfabrik Oerlikon, Zurich, Switzerland Application February 26, 1948, Serial No. 11,098
In Switzerland November 2, 1946

Section 1, Public Law 690, August 8, 1946
Patent expires November 2, 1966

3 Claims. (Cl. 33—174)

The present invention relates to the setting or adjusting of the blank in machines for cutting bevel gear wheels. It has already been proposed, to set the blank in correct position for the machining operations by means of two or more measuring devices, one of which measures the cone distance, that is to say the distance between the inner or the outer end face of the gear teeth and the point of the pitch cone of the gear to be cut, and the other measures the height of the head of a gear tooth.

It is an object of the present invention to provide a measuring instrument which is arranged to simultaneously indicate both above mentioned distances, that is the cone distance between one end face of the gear teeth and the point of the cone of the blank, and the height of a tooth head.

According to the invention, the measuring instrument comprises a measuring head which is provided with a feeler member for measuring the distance between a tooth end face and the point of the cone and with a feeler member for measuring the height of the tooth head, said feeler members being associated with indicating means adapted to simultaneously render visible the displacements of both feeler members.

The accompanying drawings represent by way of examples three embodiments of the invention.

Figs. 1 to 4 are for the purpose of explaining the geometrical theory of the measuring operations according to the invention.

Fig. 5 is a view in elevation of a measuring instrument attached to a machine for cutting bevel gears on the tool-carrying side of the machine.

Fig. 6 is a front view of the instrument seen in the direction towards the tool-carrying side of the machine.

Fig. 7 is a vertical section through the measuring head of the instrument carrying the feeler members, according to the line VII—VII of Fig. 6 and drawn to a larger scale.

Fig. 8 shows in elevation a portion of Fig. 6 drawn to a larger scale.

Fig. 9 is a horizontal section along the line IX—IX of Fig. 8.

Fig. 10 is a horizontal section through the measuring head of a modified instrument on the height of the feeler members.

Fig. 11 is a vertical section along the line XI—XI of Fig. 10.

Figure 12:
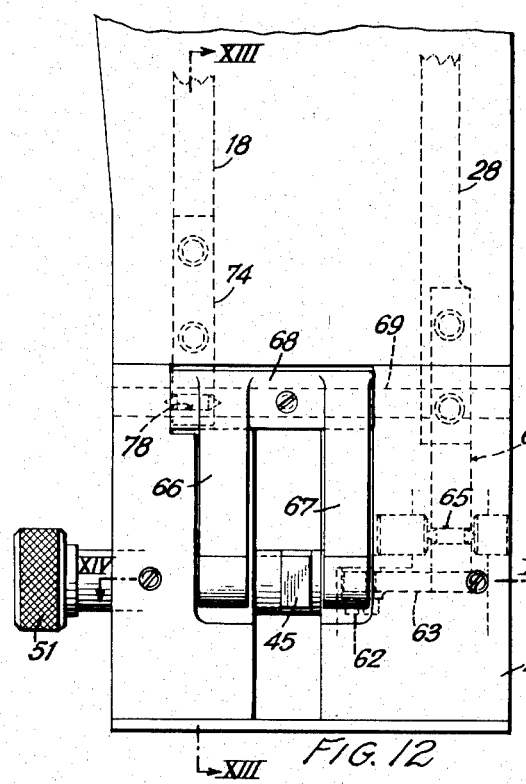
Fig. 12 is a view in elevation of a measuring head of a further modified instrument.
Figure 13:
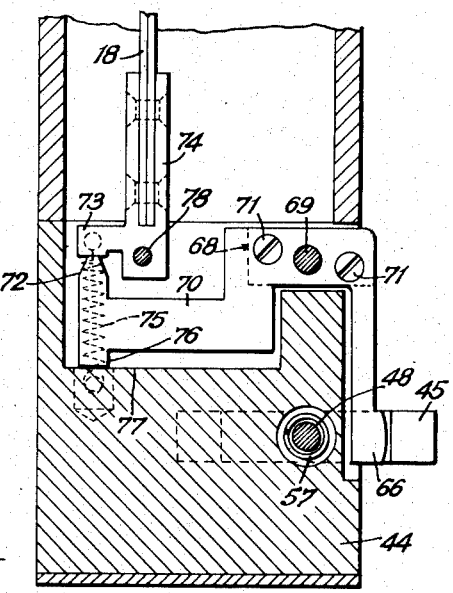
Fig. 13 is a vertical section along the line XIII—XIII of Fig. 12.

For setting the blank in a machine for cutting bevel gears it has been customary until now, when the cone angle $\delta$ in less than 45°, to measure the cone distance $Ri$ or $Ra$ on the blank (see Fig. 1) from the tool carrying side of the machine. By moving the blank in the direction of its axis C these cone distances have been adjusted to the correct calculated value, after having first adjusted the cone angle $\delta$ on the machine. With cone angles $\delta$ measuring up to 45° it is possible to effect by this method a sufficiently precise setting of the blank. However, for blanks having cone angles which are larger than 45° and particularly for cone angles approaching 90° this method of measuring is insufficient. An error $\Delta R$ of the cone distance $Ri$ or $Ra$ results in an error $\Delta h_k$ (Fig. 2), owing to a displacement of the blank in the direction of the axis C, measured in the direction of the height of the tooth $h_k$, of the following value:

$$\Delta h_k = \Delta R . tg \delta \qquad (1)$$

In the case of bevel gears having cone angles of more than 45° (see Fig. 3), the height $h_k$ of the tooth has been measured for this reason from the tool-carrying slide of the machine. This method of measuring is suitable for bevel wheels having great cone angles, but when it will be applied to bevel wheels having small cone angles below 45°, again an inconvenience will appear, since when moving the blank in the direction of its axis C, the following mistake in the cone distance $Ri$ or $Ra$ will result (see Fig. 4):

$$\Delta R = \Delta h_k / tg \delta \qquad (2)$$

This means that with small cone angles $\delta$ and a permissible deviation $\Delta h_k$, the deviation $\Delta R$ would be too great.

For this reason the two mentioned measuring methods have been separately used, that is to say the measuring of the cone distance for small cone angles $\delta = 45°$ and less, and the measuring of the head of the tooth for cone angles $\delta$ above 45°, and for this reason two measuring devices had to be used.

According to the invention it is now possible to use a single measuring instrument for setting a blank having small or great cone angles $\delta$, by combining the two measurings of the height $h_k$ of the tooth head, and of the cone distance $Ra$ or $Ri$, and by transmitting the deviations of the respective values from the correct calculated valves to a double index system.

In Figs. 5 and 6 the measuring instrument 1 is attached to the tool-carrying slide of a machine for cutting bevel gears, and is transversely movable on the machine part 2. The scale 4 formed on a transverse rail 3 and cooperating with a vernier 5 disposed on the instrument 1 serves for setting the device in the direction of the cone distance, while the machine part 2 in turn is adjustable in a direction parallel to the axis of the tool along a scale 4' formed on the machine bed, for adjusting the instrument in the direction of the height of the tooth head. The measuring instrument 1 is secured by means of a clamping screw 6 on the machine part 2 in the adjusted position.

The instrument 1 guided on the machine part 2 comprises a hollow measuring arm 7 carrying at its free end a measuring head 7' in which are movably mounted the feeler members 8 and 9 (Figs. 7 to 9). The feeler member 8 formed as plunger serves for measuring the height $h_k$ of the tooth head and the feeler member 9 formed as pivoting lever serves for measuring the cone distance $Ra$, that is the distance between the cone point P of the bevel gear to be produced and the outer end face of a tooth (Figs. 1 and 3). The plunger 8 is mounted to reciprocate in the measuring head 7' and is urged outwardly by the action of a spring 10, and its movement is limited by a pin 11 screwed into the plunger and capable of moving between two abutment surfaces 12 and 13. The plunger 8 is provided with a transverse slot 14 adapted to receive the free end 15 of a support 17 pivoted on an axis 16. This support carries an index 18. A spring 19 acts upon an extension 20 of the support 17 and tends to turn this latter in counter-clockwise direction in Fig. 7, so that its end 15 makes contact without play with the front wall of the transverse slot 14. The upper end of the index 21 moves behind a scale 22 which is disposed in an opening 23 in the measuring arms 7.

The feeler lever 9 can turn about the stud of a screw 24 screwed into the measuring head 7' in order to transmit the movements of the feeler surface effected transversely to the direction of movement of the plunger 8, to a piston 25 parallel to the plunger 8. A spring 26 urges the piston 25 towards the pivoting feeler lever 9. The movement of the piston 25 is limited by means of a pin 11 in the same manner as that of the plunger 8. The free end of a support 27 for a second index 28 engages into a transverse slot 29, provided in the piston 25. The support 27 is rotatably mounted on an axis 30 (Fig. 8) disposed in axial alignment with the axis 16 and is also charged by a spring 19. The upper end 31 of the index 28 moves behind a scale 32 which is disposed in a second opening 33 of the measuring arm.

The zero-points or origins of the two scales 22 and 32 are exactly disposed one above the other and the ratios of transmission of the index movements are arranged to be equal for both scales.

The manner of operation of the described measuring device is visible from Figs. 9 and 10. For setting a blank from which a gear is to be cut, the machine part 2 is adjusted in the direction of the axis of the feeler plunger in such manner, that for the calculated value of $h_k$ the index 21 would be situated exactly on the zero mark of its scale. The measuring device 1 is adjusted along the transverse scale 4 to the calculated cone distance, that is the value $Ri$ or $Ra$. Afterwards the blank is moved in the direction of its axis towards the measuring device 1, until the cone surface makes contact with the feeler plunger 8 or 34, and the tooth end face makes contact with the feeler levers 9 or 35. When the blank has an exact outer surface and when it is correctly adjusted the two index ends 21 and 31 are on the zero marks of their respective scales.

If the surface of the blank shows deviations of its profile, then the scale 22 indicates the errors $\Delta h_k$ of the height of the tooth head and the scale 32 shows the errors $\Delta Ri$ or $\Delta Ra$ of the cone distance. When the deviations of the profile are within permissible limits, the blank is displaced in the direction of its axis C until the deviations of the two indexes from the origin or zero mark of the scales are substantially equal. In this manner the possible permissible errors of the external profile of the blank are so distributed that they have the smallest influence on the gearing to be produced, as results from the above mentioned Formulae 1 and 2.

The modified measuring head according to Figs. 10 and 11 serves for measuring the cone distance $Ri$, that is the distance between the point of the cone and the inner end face of the teeth to be produced from the blank, and for the height $h_k$ of the tooth head. The instrument is similarly constructed as that shown in Figs. 5 and 6, but the feeler members in the measuring head 7' screwed to the measuring arm 7 are disposed according to the measurements to be effected.

A plunger 34 for measuring the height $h_k$ of the tooth head is movable in the measuring head 7' against the action of a spring 10 and its movement is limited by means of a pin 11 in the same manner as for the plunger 8 in Fig. 7. The lower end of the support 17 pivoted on a horizontal axis for the not-represented index engages the transverse slot 14 of the plunger 34 and transmits the measuring movements of the plunger to the index.

The feeler member 35 for measuring the cone distance $Ri$ can pivot about a vertical axis 36 and acts against the upturned end 38 of a lever 39 movable about a vertical axis 37 disposed below the plunger 34. This lever 39 cooperates in turn with a downwardly directed extension 40 of a piston 41 which is movable in the measuring head 7' against the action of the spring 42 and parallel to the plunger 34. The movement of the piston 41 is limited by a stop pin 11. The support 27 for the index 28 engages with its lower end the transverse slot 43 of the piston 41 and is pivotally mounted on the axis 30 disposed in axial alignment with the pivoting axis of the support 17. Both supports are charged by springs 19 which tend to turn both supports in clockwise direction in Fig. 10, so that the lower ends of the supports are always in contact with the front wall of the transverse slots 14 and 43 of the plunger 34 and the piston 41, respectively.

Fig. 10 shows that this device is used in analogous manner as the device according to Figs. 5 to 9. The plunger 34 is applied against the cone surface of the blank and the feeler lever 35 is applied against the inner end face of the teeth of the gear to be produced. The movements of the plunger 34 resulting from the deviations $\Delta h_k$ from the correct value $h_k$ are directly transmitted on the support 17 and its index, while the pivoting movement of the feeler 35 resulting from deviations ΔRi relatively to the correct value Ri is transmitted by the lever 39 on the piston 41, which engages the support 27 of the index 28.

The modified measuring head represented in Figs. 12 to 15 can be used for measuring both distances Ri or Ra, so as to avoid the necessity of having two instruments, one measuring the distance Ra (Fig. 9) and the other measuring the distance Ri (Fig. 10).

The measuring head 44 comprises two feeler arms 45 and 46 extending from a common hub 47 in diametrically opposite directions. The hub 47 is fixed to a rotatable axle 48 mounted with one end in a sleeve 49 secured to the head 44, and with the other end in a sleeve 50 carrying an operating button 51. The axle 48 has two collars 52 and 53 forming between them an annular groove 54 in which is engaged a lever 55.

Figure 14:
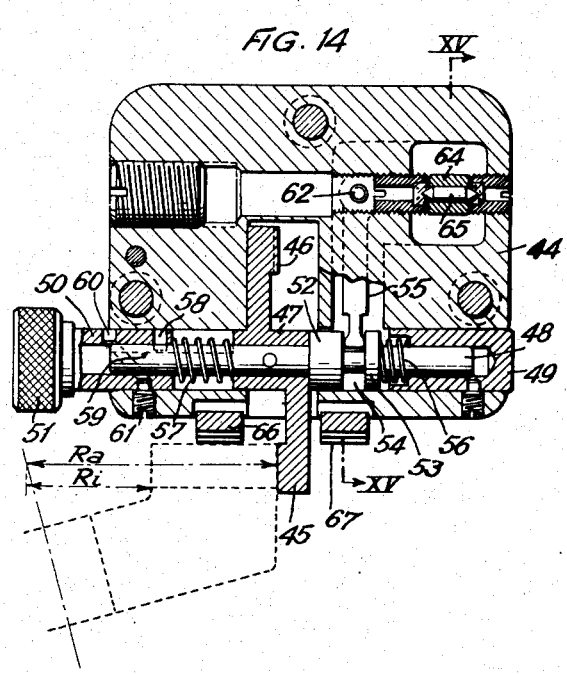
Fig. 14 is a horizontal section along the line XIV—XIV of Fig. 12.
Figure 15:
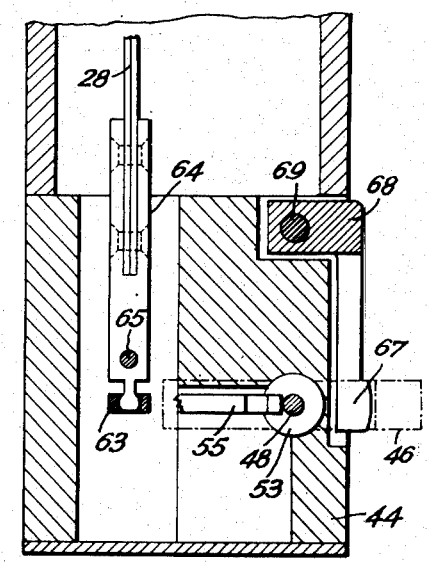
Fig. 15 is a vertical section along the line XV—XV of Fig. 14.

A spring 56 inserted between the collar 53 and the fixed sleeve 49 tends to urge the axle 48 towards the left in Fig. 14 so that the feeler arm 46 abuts against the body of the measuring head 44. A further spring 57 is inserted between the hub 47 of the two feeler arms and the movable sleeve 50. In the represented position of the sleeve 50, the spring 57 is detensioned. The sleeve 50 carries a pin 58 engaged in a longtiudinal slot 59 of the axle 48. The sleeve 50 further is provided with a helical groove 60 into which penetrates a fixed pin 61 screwed into the measuring head body. When the operating button 51 is turned through 180° the pin 58 engaging the axle 48 makes the latter turn also through 180° so that the feeler arm 46 is brought to its measuring position projecting beyond the body of the head 44, while the feeler arm 45 turns inside of the head 44. At the same time the sleeve 50 advances towards the right in Fig. 14 owing to the engagement of the pin 61 in the helical groove 59. The spring 57 is tensioned to exert a greater force than the spring 56 and urge the axle 48 with the hub 47 towards the right in Fig. 14.

In the position represented in Fig. 14, the feeler arm 45 is in its measuring position to measure the distance Ra between the cone point and the outer tooth face of the blank to be adjusted. When the axle 48 is turned through 180° by means of the button 51, the feeler arm 46 can measure the distance Ri between the cone point and the inner tooth face of a blank to be adjusted. The measuring movement of the feelers 45 or 46 is transmitted by the lever arm 55 engaging the groove 54 of the axle 48 and pivoting about a vertical pin 62 to the lever arm 63 (Figs. 12 and 15) which is in engagement with the lower end of a supporting bracket 64 carrying the index 28. The bracket 64 can rock about an axis 65 and the upper end of the index 28 moves behind a scale (not represented) showing the deviations from the correct calculated distances Ra or Ri, in the same manner as shown in Fig. 5.

The height of the tooth head $h_k$ is measured by two feeler arms 66 and 67 carried by a common hub member 68 fixed to an axle 69 rotatably mounted in the measuring head 44. The feeler arm 66 is operative simultaneously with the feeler 45 for measuring the distance $h_k$ when the distance Ra is determined, while the feeler 67 is operative simultaneously with the feeler 46 to measure the distance $h_k$ together with measuring the distance Ri. The common hub member 68 carries an arm 70 fixed to the hub member by two screws 71. The free end 72 of the arm 70 engages an extension 73 of a supporting bracket 74 rocking about an axis 78 and carrying the index 18 the upper end of which cooperates with a scale, as shown in the example according to Fig. 5, to indicate the deviations from the correct calculated distance $h_k$. A tension spring 75 constantly urges the extension 73 of the bracket 74 against the free end 72 of the arm 70, and tends to hold the abutment 76 of the lever 70 against the surface 77 of the body of the measuring head 44, which position of the lever 70 corresponds to the zero position of the index 18.

While I have shown and described certain embodiments which my invention may assume in practice, it will be understood that I do not wish to be limited thereto and that changes may be made in the arrangement and form of parts without departing from the principle of the present invention as comprehended within the scope of the appended claims.

I claim:

1. A gauge for adjusting the blank in a gear cutting machine, comprising a measuring arm provided with means for adjustably mounting the gauge to a gear cutting machine, a measuring head on said arm, two movable feeler members protruding from said measuring head and having contact faces, the contact face of one feeler member extending at right angles to the contact face of the other feeler member, whereby the two contact faces are adapted to be applied against two faces of the blank extending at right angles to each other, a measurement indicating device for simultaneously indicating the measurements of each feeler member, said indicating device including two indexes pivotally mounted in the measuring head at the free end of said measuring arm, the axes of said indexes being parallel to each other and the indexes extending within said measuring arm one behind the other towards the opposite end of the arm, means operatively connecting each index with one of said feeler members for transmitting movement from said feeler members with equal ratio of transmission to the corresponding indexes, and two scales disposed one above the other in said measuring arm and each cooperating with the free end of one of said indexes, the zero positions of said indexes being in superposed alignment, so as to permit visual comparison of the deviations of the two indexes from the corresponding zero positions.

2. A gauge for adjusting the blank in a gear cutting machine, comprising a measuring arm, means on said arm for adjustably mounting said gauge on the gear cutting machine, a measuring head on said arm, a rotatably and slidably mounted axle in said head, a feeler member carried by said axle, said feeler member having two feeler arms provided with oppositely directed contact faces, said contact faces being adapted to be applied each against one of two parallel opposed faces of said blank, fixed abutment means in said head coacting with said feeler arms to determine the measuring position of the arms, operating means for turning said axle to bring either one of said feeler arms into measuring position, means producing axial movement of said feeler arm carrying axle upon rotation of the axle to apply one or the other of the feeler arms against the corresponding abutment means, and an index operatively connected to said feeler member to be moved in response to axial movement of said feeler arm carrying axle.

3. A gauge for adjusting the blank in a gear cutting machine, comprising a measuring arm, means on said arm for adjustably mounting said gauge on the gear cutting machine, a measuring head on said arm, a rotatably and slidably mounted axle in said head, a feeler member carried by said axle, said feeler member having two feeler arms provided with oppositely directed contact faces, said contact faces being adapted to be applied each against one of two parallel opposed faces of said blank, fixed abutment means in said head coacting with said feeler arms to determine the measuring position of the arms, operating means for turning said axle to bring either one of said feeler arms into measuring position, means producing axial movement of said feeler arm carrying axle upon rotation of the axle to apply one or the other of the feeler arms against the corresponding abutment means, a second feeler member pivotally mounted in said measuring head, said second feeler member having a contact face extending at right angles to said oppositely directed contact faces to be applied against a face of the blank extending at right angles to said two parallel faces, a measurement indicating device for simultaneously indicating the measurements of each feeler member, said indicating device including two indexes pivotally mounted in said measuring head, the axes of said indexes being disposed in axial alignment with each other, means operatively connecting each index with one of said feeler members for transmitting movement from the feeler members with equal ratio of transmission to the corresponding indexes, and two scales disposed one above the other in said measuring arm and cooperating each with one of said indexes.

PAUL ASCHWANDEN.

References Cited in the file of this patent

UNITED STATES PATENTS

| Number | Name | Date |
|---|---|---|
| 391,513 | Colby | Oct. 23, 1888 |
| 1,048,073 | Hirth | Dec. 24, 1912 |
| 1,122,069 | Brown | Dec. 22, 1914 |
| 1,175,401 | Barnes | Mar. 14, 1916 |
| 1,949,014 | Gleason | Feb. 27, 1934 |
| 2,371,451 | Larson | Mar. 13, 1945 |
| 2,443,895 | Day | June 22, 1948 |

FOREIGN PATENTS

| Number | Country | Date |
|---|---|---|
| 78,021 | Sweden | Aug. 8, 1933 |

OTHER REFERENCES

American Machinist, February 1946, page 132.